United States Patent Office 2,790,553
Patented Apr. 30, 1957

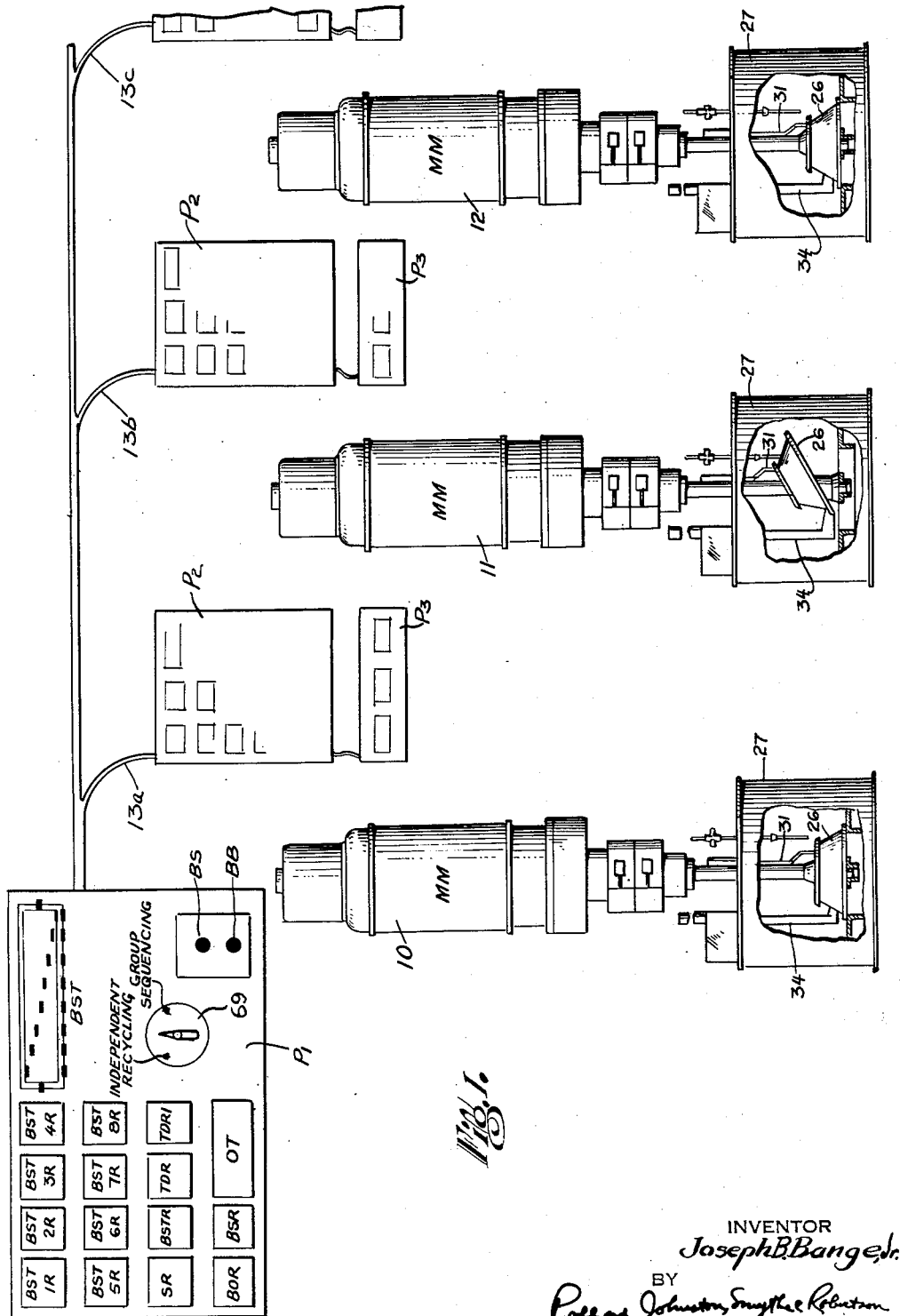

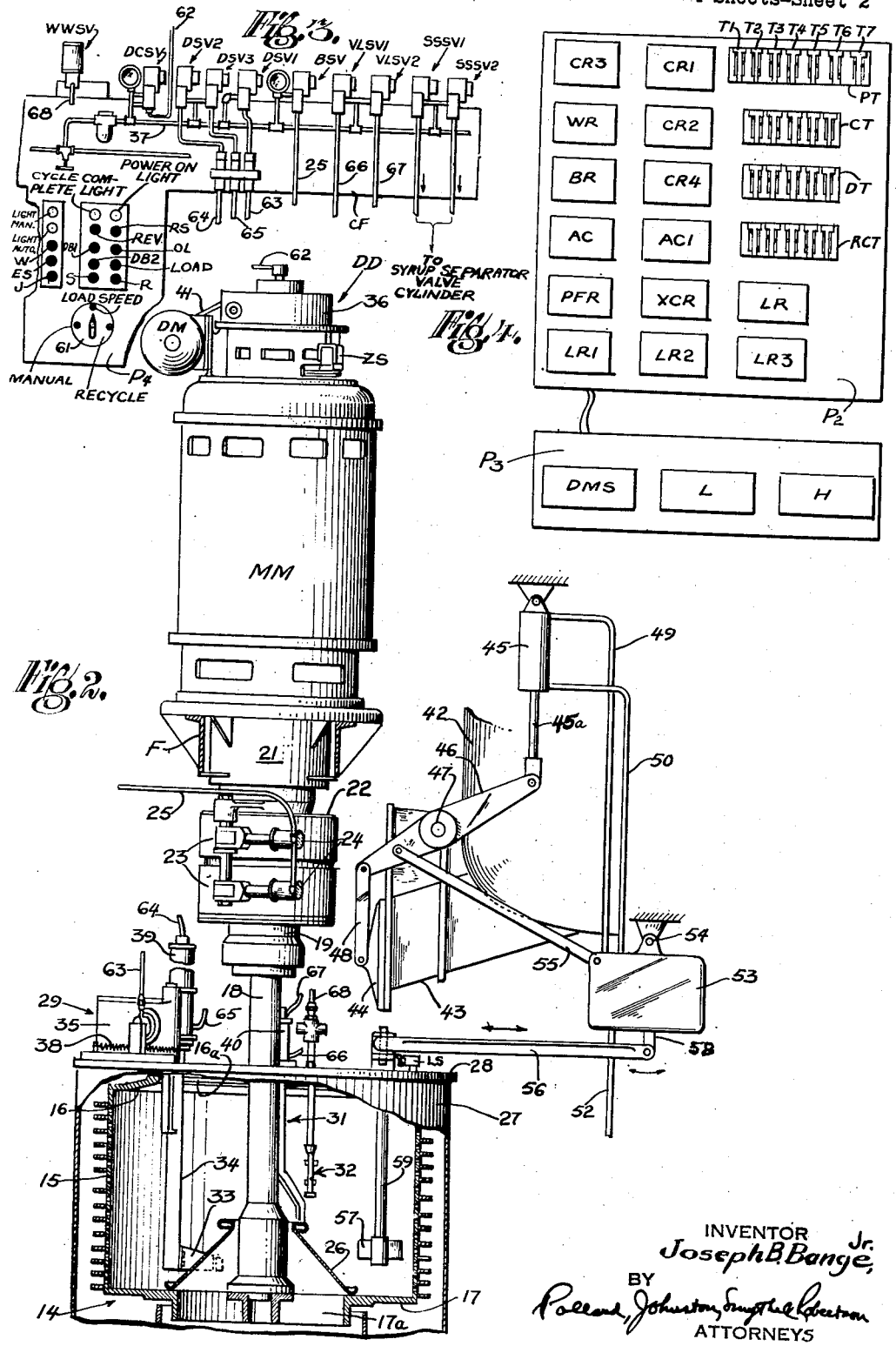

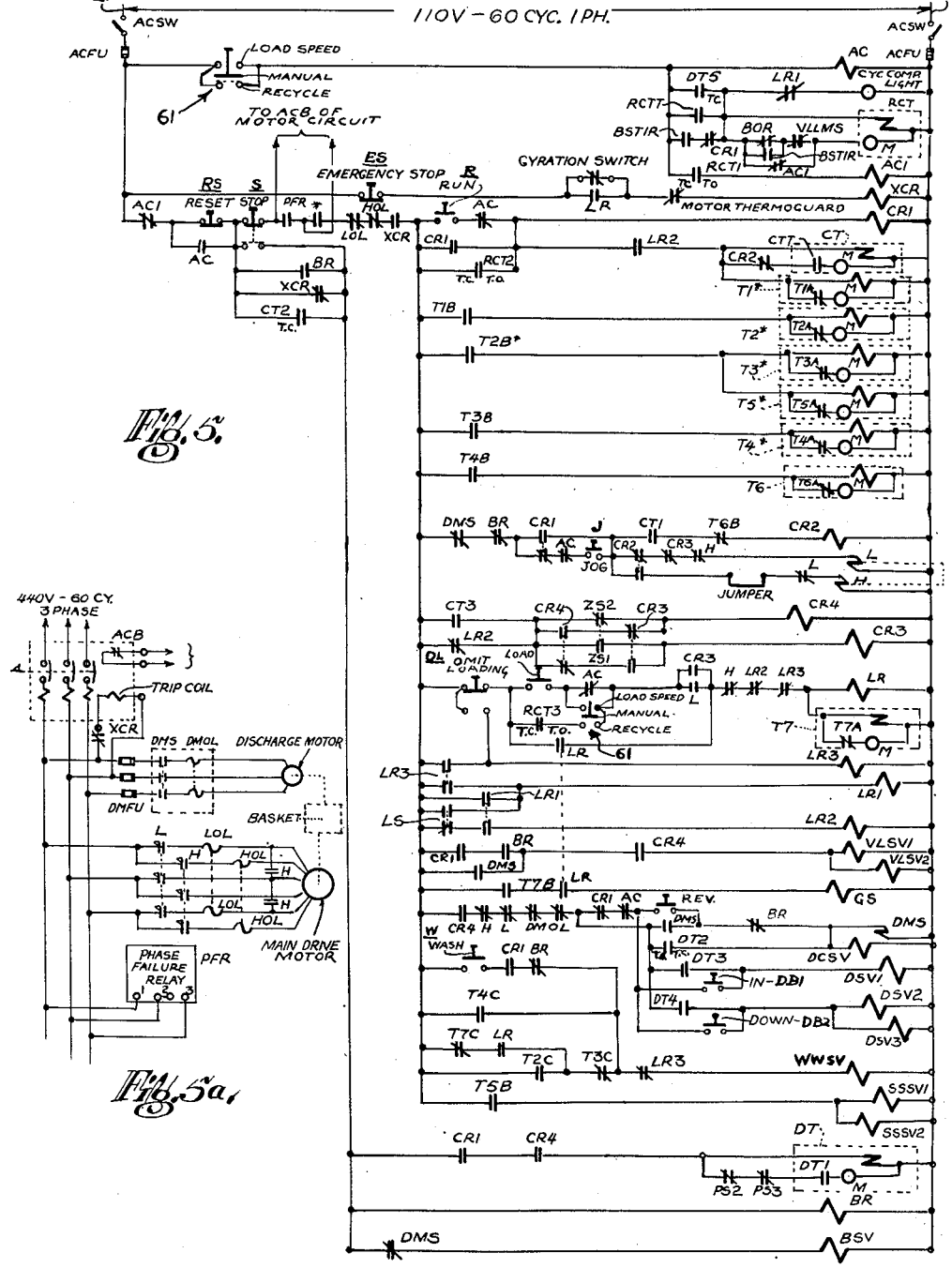

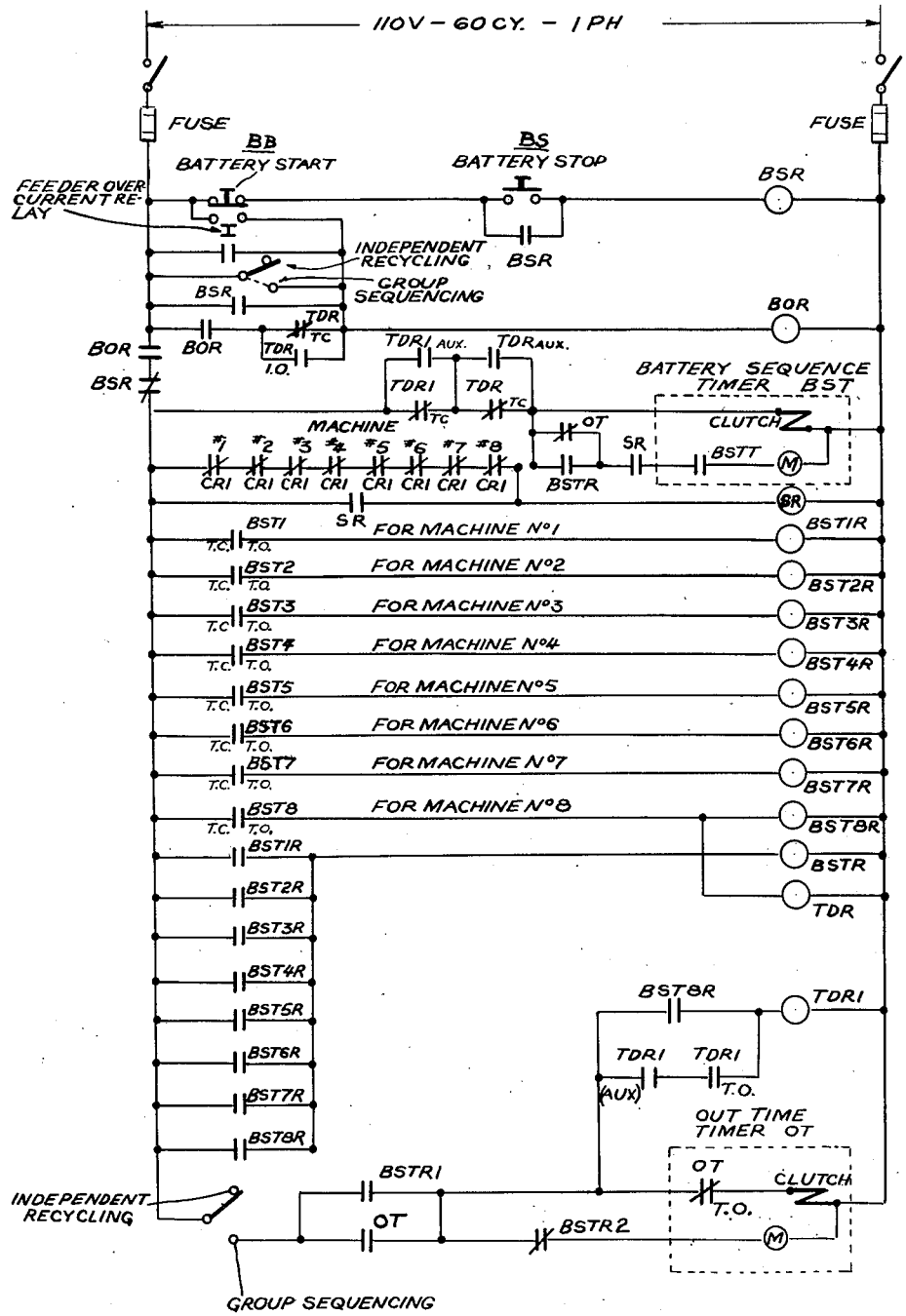

2,790,553

CENTRIFUGAL BATTERY CONTROL SYSTEM

Joseph B. Bange, Jr., Hamilton, Ohio, assignor to The Western States Machine Company, Hamilton, Ohio, a corporation of Utah Application June 20, 1955, Serial No. 516,605

6 Claims. (Cl. 210—138)

This invention relates to a control system to supervise the operation of a battery of heavy cyclical centrifugal machines of the type used in the manufacture and refining of sugar.

In the use of a battery of several such machines, it is important to stagger the starting of the respective cycles of operation, for otherwise the large amount of power required for the acceleration of each machine will be demanded by several machines simultaneously and the resulting power peaks will either overload the source of power for the battery or require an inordinately expensive power source. Even when the centrifugal machines are operated under automatic control, there is a possibility of overburdening the power source with overlapping power peaks, because of the fact that the duration of certain operations in the cycle of each machine, for example, the loading time, the braking time, or the discharging time, is susceptible to variation.

An important object of this invention is to provide a control system for a battery of heavy cyclical centrifugal machines whereby the cycles of operations of the several machines are started and maintained automatically in a desired stagged relationship so that the danger of overloading the source of power for the battery by the concurrent acceleration of several machines is avoided.

Another object is to provide such a battery control system which, after starting the cycles of the several centrifugals in a desired staggered relationship, will become inactive and allow each machine to run and repeat its cycles independently under its own automatic control system.

Still another object is to provide such a battery control system whereby, if the cycles of two or more of the machines in operation should happen to coincide sufficiently that a power overload may be imminent, all the machines will be stopped after completing their pending cycles and will then be restarted automatically in a definitely timed sequence.

A further object of this invention is to provide a battery control system whereby the cycle time and productivity of the several centrifugals of the battery can be selected and maintained at any desired value within the capacity of the battery, without discontinuing the service of any of the machines.

According to the present invention, each of the heavy cyclical centrifugal machines in a battery or installation of a plurality of such machines is provided with its own control system for automatically programming the machine through a predetermined cycle of operations independently of the cycles of the other machine; each individual control system is provided with recycling means for causing it to enter into and automatically to repeat its cycle; and a battery control is provided which has elements so connected with and operative upon the respective recycling means of the several machines that the starting of their respective cycles of operation is brought about in a definitely timed sequence. To this end, the battery control comprises a plurality of actuators respectively operable to activate the individual recycling means of the several machines, together with timing means which have a plurality of correlated timing elements operated successively at predetermined intervals to operate the several actuators in a predetermined sequence.

According to another feature of the invention, the battery control also is provided with means rendered operative upon the starting of the last-to-be-started machine of the battery for inactivating the battery control, so that the several machines thereafter will repeat their respective cycles independently of each other and of the battery control. In this way, each machine is able to give its maximum production according to its own automatically controlled program of operation, without any limitation upon or interference with its efficiency by the action of the battery control.

Because of the variable duration of certain operations in the cycle of each machine, however, there is a likelihood that the machines of the battery gradually will lose the ordered relationship of their cycles to such an extent that overlapping periods of acceleration of two or more of the machines may make imminent an excessive drain on the source of power for the battery. The occurrence of such a drain or power overload is prevented, according to a further feature of this invention, through the provision in the battery control of means which, upon the occurrence of an inordinate power flow to the battery, will operate to terminate the recycling of all the machines and thus cause them to complete their pending cycles and come to rest. This means may include a current responsive device connected with the power feed lines to the battery and operable through the battery control to inactivate the recycling means in the individual control systems of all the machines. When all the machines have come to rest, the aforesaid timing means of the battery control are started automatically through connections in that control, whereupon the several machines of the battery will be restarted on their respective cycles in the desired timed sequence.

According to a further embodiment of this invention, the battery control is also provided with means whereby the total productivity of the battery can be varied at will between a maximum value determined by the minimum duration of the respective independent cycles of the machines and any desired lesser value. This variability is brought about without either removing machines from production or objectionally lengthening the high speed operation of the individual machines, since either of those expedients may lead to costly troubles if the machines are used for processing certain types of sugar massecuites. To this end, the battery control is provided with a selector switch which may be switched to a "group sequencing" position wherein an adjustable "out time" or delay timer is connected with the other elements of the battery control. This delay timer is arranged to be started in response to the operation of each of the timing elements hereinbefore mentioned, and it adds a selected interval of time to the respective intervals normally provided by the successive operations of said timing elements. Thus, each cycle of each machine of the battery may be followed by an adjustable period of "out time" during which the machine will be inactive, before the next cycle of the same machine is started by the action of the battery control.

Other objects, features and advantages of the invention will appear from the following detailed description and the accompanying drawings of an illustrative embodiment thereof.

In the drawings:

Fig. 1 is a schematic view of a plurality of heavy cyclical centrifugal machines associated with their individual control systems and with a common battery control in accordance with this invention;

Fig. 2 is a diagrammatic side elevation, partly in section, showing a typical centrifugal machine of the battery in association with its main functional elements;

Fig. 3 is a schematic view of certain elements of the individual control system of the typical machine;

Fig. 4 is a schematic view of control panels included in such an individual control system;

Fig. 5 is an elementary wiring diagram indicating the manner of operation of each individual control system;

Fig. 5a is a diagram of the motor control circuit of each centrifugal machine; and Fig. 6 is an elementary wiring diagram indicating the manner of operation of the battery control system.

In Fig. 1 of the drawings, a cyclical centrifugal installation is shown diagrammatically, comprising a battery control panel P1 which supports the principal components of the battery control and a plurality of heavy cyclical centrifugal machines such as 10, 11 and 12. The several machines have their own individual control panels P2 connected with the battery panel P1 through cables 13a, 13b, 13c, etc. These centrifugal machines are of the fully automatic type, i. e., they go automatically through the functions of loading, centrifuging and discharging, and then they are recycled automatically. Only three centrifugals have been diagrammed in Fig. 1. The system illustrated is adapted for eight machines, but it is to be understood that any desired number of centrifugals may be employed in a battery.

Each centrifugal machine embodies structures and controls of the types disclosed in United States Patent No. 2,667,974, issued February 2, 1954, in the name of Joseph Hertrich for "Heavy Cyclical Centrifugal Machine." The loading gate serving each machine is controlled according to the disclosure of a copending application Serial No. 261,258, filed December 12, 1951, now Patent No. 2,727,630. The curb of the machine may have a sliding cover coordinated with the operation of the loading gate according to the disclosure of a copending application Serial No. 441,369, filed July 6, 1954, which is assigned to the same party as the present application.

More particularly, as indicated in Fig. 2 of the drawings, each centrifugal has a large perforated basket 14 carried by the lower end of a spindle 18 which is suspended in a gyratory manner from a suitable head 19 supported by a hanger structure 21 from framework F. A large electric motor MM may be used as the prime mover of the machine, its shaft being connected directly with spindle 18 through structures in the head 19, in known manner.

Motor MM is operative upon the basket 14 in a clockwise direction, as viewed from above in Fig. 2. This direction of rotation continues through the centrifuging operation and while the basket is being decelerated to terminate each spinning period. Discharging is brought about with the basket rotating at a low speed in the opposite direction under the influence of a low speed or discharge drive DD which comprises a clutch (not shown) having its driving element powered by a motor DM at the top of the main motor MM. The discharge clutch is active when compressed air is admitted to it through line 62 from a solenoid valve DCSV (Fig. 3). The air pressure expands the driving clutch element into engagement with the driven element. Solids then in the basket are discharged by the action of mechanical discharger shoe 33 which extends in the direction of the normal basket rotation so that it can act only when the basket is driven in the reverse direction.

Deceleration from the centrifuging speed is brought about by a combination of regenerative braking and friction braking, although friction braking alone can be used if desired. Motor MM is made with both high speed (say 1800 R. P. M.) and low speed (say 900 R. P. M.) windings which are energized, respectively, through contactors H and L (Fig. 4) by controls to be described hereinafter. The motor is switched from the high speed winding to the low speed winding at the end of the desired period of full speed operation, in order to bring about a suitable interval of regenerative braking utilizing the retarding action of the low speed motor winding. After such an interval, the motor is completely deenergized and friction braking ensues to complete the normal deceleration of the basket. For friction braking, a brake drum 22 is carried with the basket shaft assembly, and friction bands 23 are movable against the drum by action of connected air cylinders 24. In known manner, the bands normally are held free of the drum by springs and are set by admitting air pressure to the cylinders 24 through an air line 25 leading from a solenoid valve BSV (Fig. 3).

The treated solids discharged by discharger shoe 33 after each spinning period pass out of the basket through opening 17a in the basket bottom 17. A frusto-conical valve 26 fitting outlet 17a surrounds shaft 18 and is movable vertically to expose the outlet during each discharging operation. Basket cap 16 has a central opening 16a affording access to the interior of the basket. The entire basket is surrounded by a stationary curb 27 which collects the liquid expelled during spinning periods and has a centrally open top 28 providing support for the discharger mechanism at 29, for a valve lifting device at 31, and for a conventional sprayer 32 which is used for washing solids in the spinning basket.

Details of a suitable discharger mechanism are set forth in United States Patent No. 2,667,974. This mechanism includes a housing 35 which carries the discharger shaft 34 and is swingable horizontally about a supporting stud (not shown) that projects upwardly from the curb top 28. A solenoid valve DSV1 (Fig. 3) controls the admission of fluid pressure from header 37 through pressure line 63 to a cylinder formed in the housing, whereby the housing is swung so as to move the discharger shaft and shoe outwardly from a normal or rest position into engagement with solids in the basket. A tension spring 38 constantly urges the housing in the opposite direction, so as to move the shoe inwardly away from the basket side wall when the valve DSV1 is deenergized.

Vertical movements of the discharger shoe are brought about by the action of a fluid pressure cylinder 39 which is mounted in a vertical position alongside the shaft 34 and has its plunger coupled with the shoe 33.

Solenoid valves DSV2 and DSV3 control the admission of fluid pressure to the upper and lower ends of cylinder 39, respectively, in order to bring about downward and upward movements of the shoe. Each of these solenoid valves is a three-way valve connected with the pressure header 37. Solenoid valve DSV3 when deenergized admits the pressure fluid from header 37 into the lower end of cylinder 39, so that the discharger shaft and shoe normally are held in a raised position near the top of the basket. When both DSV2 and DSV3 are energized, the header pressure is admitted through DSV2 into the top of cylinder 39 and the fluid pressure in the lower end of the cylinder is released through DSV3, whereupon the discharger shoe is moved downwardly in the basket. The shoe is raised again when the two solenoid valves are deenergized.

The above-mentioned valve lifting device at 31 includes a fluid pressure cylinder 40 to which a supply of compressed air is brought by air lines 66 and 67 controlled by solenoid valves VLSV1 and VLSV2, respectively. The solenoid valves VLSV1 and VLSV2 are three-way valves which normally are deenergized. When they are deenergized, fluid pressure is maintained in the lower end of cylinder 40 through line 66, so that the basket valve 26 normally will be kept in its closed position. When VLSV1 and VLSV2 are energized, the compressed air from header 37 is admitted through VLSV2 into the upper end of cylinder 40 and the lower end of the cylinder is vented through line 66 and valve VLSV1, whereupon the basket valve 26 is lifted away from its seated position to open the basket outlet 17a.

The several phases of operation of the discharger mechanism at 29 are controlled through the agency of a "Discharge Timer" DT (Fig. 4), the electrical connections of which are diagrammed in Fig. 5.

The activation of the discharge drive DD and the discharge timer DT is controlled through the agency of a "zero speed switch" ZS, shown at the top of motor MM in Fig. 2.

The loading of charge material into each centrifugal machine is effected according to the disclosure of the aforesaid copending application Serial No. 261,258. A material supply tank 42 (Fig. 2) has a loading spout 43 for each machine. The spout is fitted at its lower end with a loading gate 44 which is positioned to deliver the charge material from the tank directly into the basket 14 through the openings in the curb top 28 and the basket top 16. The gate is opened by admitting fluid pressure to the upper end and venting the lower end of a pressure cylinder 45, whereupon piston rod 45a rocks lever 46 clockwise on its axis at 47 and raises the gate closure through link 48. When the pressure conditions in cylinder 45 are reversed, the gate is moved to closed position.

Air lines 49 and 50 conduct the pressure fluid, e. g., compressed air, to or from the upper and lower ends of cylinder 45 from a supply line 52, depending upon the position of a control device or air valve (not shown) located inside a servo-motor control box 53. The control box is positioned on a pivot 54 according to the position of a link 55 which connects the control box to lever 46. A shiftable member 58 which positions the air valve inside the box has a link connection at 56 with an arm on the upper end of a vertical shaft 59 that extends into the basket 14 and carries a charge feeler 57 on its lower end. Inside the control box is a solenoid arranged to position the upper end of member 58 so that the latter will cause the air valve to deliver pressure through air line 49 when the solenoid is energized and will cause it to deliver pressure through air line 50 when the solenoid is deenergized.

Reference should be had to said application Serial No. 261,258 for further particulars of the loading control mechanism. It should suffice here to point out that a loading operation is started by energizing the solenoid inside control box 53 and is terminated by deenergizing that solenoid. When the solenoid is energized, the gate opens, box 53 is swung clockwise by link 55, the charge feeler 57 is swung toward the basket side wall by the resulting motion of link 56, and a limit switch LS is tripped by a cam at the top of the feeler shaft. As a wall of charge material builds up in the basket, the charge feeler is moved inward by this wall and members 56 and 58 are then positioned so as to cause a partial closing movement of the gate. That movement repositions the control box so that the gate stays open until a further inward movement of the feeler brings about a further gate closing movement. This progressive closing of the gate in accordance with the progressive building up of the charge continues until the charge wall has approximated a desired final thickness, whereupon limit switch LS is operated to deenergize the solenoid in box 53 and thus cause the gate to move directly to its fully closed position.

INDIVIDUAL MACHINE CONTROLS

The functions of the several elements of each centrifugal machine may be initiated and controlled manually to any desired extent, but for normal operations an automatic cycle control system is provided for each machine, by which its operations are carried out automatically in the desired sequence. In the embodiment shown, this system makes use of control elements and operations like those disclosed in U. S. Patent No. 2,667,974, which are combined with other elements in ways to achieve the objects of the present invention.

As diagrammed, the various control elements of each machine include push button switches and a selector switch 61 on panel P4 (Fig. 3), several solenoid valves with pressure regulators on control framing CF, and electrical control relays, timers and motor contactors on remote control panels P2 and P3. In addition, the "zero speed" switch ZS of each machine has a "low speed" contact ZS2 which is closed as the basket speed approaches zero, e. g., at about 200 to 225 R. P. M., and which must be closed in order for the discharging functions to take place, and also a "high speed" contact ZS1 which normally is open but closes when the basket speed rises beyond a safe loading speed, e. g., at about 275 R. P. M.

The control elements are interconnected electrically to operate as indicated by the wiring diagram of Fig. 5. In that diagram, relay contacts are shown separately from the respective relay coils by which they are opened and closed, in order that their functions may be clearly indicated. The contact or contacts belonging to a certain relay are designated by corresponding reference characters, with or without suffixed numerals to distinguish between different contacts of the same relay.

The push buttons on panel P4 close or open control circuits directly when pushed. These include buttons:

R, for starting a running or spinning period of the machine;
Load, for manually activating the loading control mechanism;
OL, for omitting the loading operation so that troubles can be checked by manually running the machine through a cycle without loading the basket;
S, for manually stopping the machine at any time;
RS, for resetting the automatic controls before starting a new cycle;
Rev., for activating the reverse or discharge drive DD;
J, for manually jogging or holding main motor MM on its low speed winding if a loading speed is to be obtained manually;
W, for manually actuating valve WWSV to deliver washing fluid through the sprayer;
ES, for the emergency stopping of the machine;
DB1, for manually actuating solenoid valve DSV1 to swing the discharger outward and inward; and
DB2, for manually actuating solenoid valves DSV2 and DSV3 to move the discharger down and up.

As shown in Fig. 5, the contacts of push buttons RS and ES are normally closed. Those of the remaining push buttons are normally open, except that push buttons OL and S have both normally open and normally closed contacts. Valve WWSV is a two-way solenoid valve on a washing fluid supply line (not shown). Valves DCSV, DSV1, DSV2, DSV3, BSV, VLSV1, VLSV2, SSSV1 and SSSV2 are air solenoid valves conected with the pressure header 37, each having an active position in which it connects the header with a line to the element controlled by the valve and also another position in which it connects that line to a vent. Valves DSV3 SSSV1 and VLSV1 are active when deenergized, so that they will continue suplying pressure to keep the discharger shoe in its raised or rest position and the syrup separator positioned to collect "green liquor," and to keep the basket valve in its seated position, while the machine is spinning, and even when all the control circuits are open.

The timers indicated on panel P2 are adjustable time relays or time delay switches of known construction. They may be of the "multiflex" type wherein several individually timed contacts are incorporated in a composite unit, although an equivalent number of separate timer units would also serve. A "process" timer group PT comprises seven individual timer units T1 to T7, inclusive, found in the wiring diagram of Fig. 5. A "control timer" CT has four numbered contacts CTT, CT1, CT2 and CT3, found in that diagram. A "discharge timer" DT has five such numbered contacts DT1 to DT5, inclusive. A "recycle timer" RCT also is provided to function in the manner hereinafter described.

Aside from those timers, the control panel P2 may carry the several control relays and protective relays of which designations are given in Fig. 4 and corresponding coils and contacts are diagrammed in Fig. 5. Control panel P3 of Fig. 4 similarly carries motor contactors L and H for energizing the low and high speed windings of prime mover MM, and a contactor DMS to control the operation of the discharge motor DM. The driving motor circuits and motor contacts controlled by the contactors L, H and DMS of each machine are diagrammed in Fig. 5a.

The control circuit for each centrifugal machine is energized when switches ACSW are closed in the current supply lines L1 and L2 of Fig. 5. If a motor thermoguard and a gyration switch are then inactive, current flows to relay XCR which closes its normally open XCR contacts to bring control energy to the circuits in parallel with the run button R (assuming that the protective overload relays LOL and HOL (Fig. 5a) are inactive and that the protective phase failure relay PFR has closed its contacts in the line to the RUN button). When XCR is thus energized, its normally closed contacts leading to the discharge timer DT, brake relay BR and brake solenoid valve BSV are opened. If reset button RS is then depressed, those control elements are deenergized so that the parts of the machine controlled by them may be inactive. At the same time, relay CR4 is energized through normally closed contacts LR2 and ZS2 of Fig. 5.

The individual machine is now ready to enter into a cycle of operations. Illustrative details of its operations according to the diagram of Fig. 5 will be set forth hereinafter. At this point, it is appropriate to point out that the extent of the operations performed automatically according to the present embodiment will depend upon the setting selected for the selector switch 61, which has three different positions designated as "Load Speed," "Manual" and "Recycle."

As further shown near the top of Fig. 5, the control elements for each machine, according to the present invention, also include a recycle timer RCT. This timer is associated with relays AC and AC1, with a "Cycle Complete" light and with various contacts, in a group of circuits which are energized only if the selector switch 61 is set either at its "Load Speed" position or its "Recycle" position.

If the selector switch is set at its "Manual" position, the recycle timer RCT and other control elements just mentioned are kept deenergized, so that there is no automatic actuation of the loading relay LR and process timer T7 (shown near the middle of Fig. 5). In that event the individual machine can be brought to loading speed through relay CR1 and contactor L, by pushing run button R; then it may be loaded by pushing the Load button, whereupon it will automatically preflush the basket, load itself, accelerate, wash the basket charge, spin at high speed, decelerate, reverse itself, discharge itself and come to rest with the brake applied. Then it will stay at rest until its controls are manually reset by use of button RS and the main motor is manually restarted by use of button R.

If the selector switch is set at its Load Speed position, control relay AC is kept energized to open the line between the Run button and relay CR1, and the recycle timer RCT will take a part in the operations. After the completion of discharging, timer RCT may be energized through discharge timer contacts DT5. RCT then will energize relay CR1 through contacts RCT2, so as to close CR1 contacts which energize contactor L and cause the low speed contacts L to start the main motor MM. The machine comes to a loading speed, whereupon loading may be achieved by pushing the Load button. After loading, the controls will carry the machine through its prescribed operations automatically until it is again ready to be loaded in the next cycle.

If the selector switch is set at its Recycle position, not only the operations obtained automatically at the Load Speed position but also the loading and further cycle operations will be brought about automatically, so that the entire cycle of operations may be performed and restarted under automatic control. This results, in part, from the connections made through the selector switch to the recycle timer and associated control elements, and to the loading relay LR. Accordingly, in this setting of the controls, each machine of the illustrated embodiment, after having been started on one cycle, may continue running repeatedly through its complete cycle of operations, including starting, loading, acceleration, washing, drying (spinning at full speed), deceleration, reversal to the negative discharging speed, discharging, stopping, resetting and restarting. That mode of operation will continue, however, only if suitable conditions exist at the end of each cycle, as determined by the circuits of the recycle timer RCT and by the battery sequence control circuits of Fig. 6.

More particularly, when selector switch 61 is set at its Recycle position, these conditions exist: Relay AC is energized and its contacts AC are opened to hold open the line between the RUN button and control relay CR1. The machine having been idle, its electrical control elements will be in a reset condition, and each of the contacts DT5, RCTT, BST1R and RCT1 will be open. Accordingly, no energy will flow to the recycle timer; so its normally open contact RCT2 will be open, and relay CR1 will stay deenergized until something occurs in the battery controls to energize RCT through contacts BST1R. On the other hand, when contacts BST1R are closed through the operation of the battery controls presently to be described, the recycle timer will be energized through normally closed CR1 contacts; it will hold itself energized by closing contacts RCTT; it will close its RCT2 contacts to energize CR1, whereupon CR1 contacts in the line to contactor L will close to start the main motor on its low speed winding; and through further control operations, to be described in detail hereinafter, the machine will be carried through its cycle until, after the discharging operation, contacts DT5 of the discharge timer DT are closed to energize the recycle timer RCT again. This last mentioned operation, however, will not energize the motor of RCT to restart the machine unless the normally closed contacts BOR in the circuit to the motor of RCT are then closed. Those contacts, like the contacts BST1R, are governed by the operation of the battery sequence control circuits of Fig. 6.

BATTERY SEQUENCE CONTROLS

The battery sequence controls comprise the elements diagrammed on panel P1 of Fig. 1, which are connected together and with the individual machine controls of the eight centrifugal machines in the relationship indicated by the wiring diagram of Fig. 6. The elements on panel P1 include:

Push buttons BB and BS respectively for starting and stopping the operations of the battery;

A selector switch 69 having two distinct operative positions;

A battery sequence timer BST, which functions as a stepping switch having a plurality of contacts, including one for each centrifugal machine;

A plurality of battery sequence timer relays BSTR and BST1R to BST8R, inclusive—including one of the following for each machine;

Battery operating relay BOR;
Battery stop relay BSR;
Starting relay SR;
Time delay relays TDR and TDR1; and
"Out time" timer OT.

As shown in Fig. 6, the control relay CR1 of each centrifugal machine of the battery has a normally closed contact CR1 in a circuit leading to the starting relay SR of the battery sequence controls. These CR1 contacts of the several machines are connected in series, so that all of them must be closed before they can serve to energize the starting relay, which in turn serves to energize the battery sequence timer BST. The battery sequence timer itself has a timer-closed and timer-opened contact for each machine, i. e., contacts BST1 to BST8, inclusive, and these contacts control the respective circuits to the battery sequence timer relays BST1R to BST8R, inclusive. Those relays, in turn, have normally open contacts connected in parallel across the circuit to relay BSTR, so that BSTR is energized to close its contact BSTR in the circuit to the motor of the battery sequence timer BST whenever any one of the battery sequence timer relays is energized.

The respective relays BST1R to BST8R also have two normally open contacts in the circuits to the recycling timers RCT of the respective individual centrifugal machines (e. g., contacts BST1R in Fig. 5). And the battery operating relay BOR has a normally closed contact in a circuit to the motor of each recycling timer RCT, as also seen in Fig. 5.

Further, the circuit to the last of the battery sequence timer relays, e. g., relay BST8R, is connected with time delay relay TDR so as to energize the battery when BST8R is energized. TDR, in turn, has contacts in a circuit to relay BOR, whereby all the battery control relays will be deenergized at a predetermined time interval, say about 1 second, after the opening of contact BST8.

The last-mentioned mode of operation will occur if the selector switch 69 is set at its "Independent Recycling" position. In that event, after the several centrifugal machines have been started in a desired timed sequence by the operation of the battery control, each machine may continue to recycle itself quite independently of the operations of the other machines of the battery. This manner of independent recycling, however, will continue only for as long as coinciding periods of acceleration of two or more of the machines do not cause a power flow to the entire battery of machines in excess of a predetermined safe limit. That limit is determined by a feeder overcurrent relay (Fig. 6) in the power feed lines to the battery, which relay has a normally open contact at I in a circuit to the battery operating relay BOR. Whenever the current flow to the battery exceeds the limit set by the overcurrent relay, BOR is energized to open the several BOR contacts in the RCT motor circuits of the several machines of the battery. It results that the recycling timers RCT of the individual machines cannot close their RCT2 contacts to energize their respective CR1 relays; so the individual machines may complete their pending cycles and come to rest, but none of them will start itself again on a new cycle. When all of them are at rest, however, all of the several CR1 contacts of the battery sequence controls will be closed and able to energize the starting relay SR of the battery sequence controls, whereupon those controls will restart the machines in the desired sequence, as described in detail hereinbelow.

If the selector switch 69 is set at its "Group Sequencing" position, all the cycles of the individual machines will be started at definite intervals under the continuous control of the battery sequence controls. In that position, switch 69 holds relay BOR energized to keep the normally closed BOR contact of each machine open at all times, thus keeping the recycle timers RCT of the individual machines subservient to the action of the battery sequence timer BST.

Further, the setting of switch 69 for Group Sequencing brings actively into the battery controls the circuits of Fig. 6 leading to time delay relay TDR1 and to the Out Time timer OT, whereby the starting intervals of the individual machines may be selected so as to obtain any desired rate of production from the machines of the battery while keeping all the machines in service. It results that upon the energization of each of the battery sequence timer relays BST1R to BST8R, contacts BSTR1 of relay BSTR are closed in the circuit to the out time timer OT. Timer OT then opens its OT contacts in the circuit to the motor of the battery sequence timer BST and stops that motor until after the expiration of a preset interval of time determined by the setting of OT. After that interval, the motor of BST is restarted. Thus the time setting of OT is added to the interval normally fixed by BST between the successive startings of different machines of the battery.

DETAILED OPERATIONS OF THE BATTERY SEQUENCE CONTROLS

With all the centrifugal machines of the battery empty and at rest, and with the individual controls of each machine energized through switches ACSW and relay XCR, the selector switch 61 of each machine is set at its RECYCLE position. The battery of machines is now ready to be started by the action of the battery sequence controls.

A. *Starting the machines*

If the maximum productivity of the battery is desired, selector switch 69 of the battery control is moved to its Independent Recycling position. Then an attendant presses the battery start button BB, and the following operations take place:

1. Relay BOR is energized through a circuit closed by the battery start button, whereupon:

(a) Normally open BOR contacts close to keep relay BOR energized.

(b) Other normally open BOR contacts close in the line leading to the battery sequence timer BST and to the battery sequence timer relays BST1R, etc., so the clutch of BST is energized, and contact BSTT closes in the circuit to the motor of BST.

(c) Since all the machines are at rest, all eight of the CR1 contacts in Fig. 6 are closed; so relay SR is energized.

(d) Normally open SR contacts then close to keep relay SR energized and to start the motor of the battery sequence timer.

(e) Meanwhile, relay BOR has opened the normally closed BOR contacts in the RCT motor circuit (Fig. 5) of each machine.

2. The battery sequence timer BST having been started in operation, an element of this timer closes contacts BST1, whereupon:

(a) Relay BST1R is energized;

(b) Normaly open BST1R contacts close to energize relay BSTR; and (c) Other normally open BST1R contacts in the control circuits of machine #1 (Fig. 5) are closed to energize both the clutch and the motor of the recycling timer RCT of machine #1. This timer keeps itself energized by closing its contacts RCTT. Then it closes its contacts RCT1 to energize relay AC1 and thus reset the timers and relays of the machine. Contacts RCT1 are reopened shortly thereafter, whereupon timer RCT proceeds to start the cycle of operations of machine #1 as follows:

(1) Contacts RCT2 are closed by RCT, to energize control relay CR1. This relay, by closing normally open CR1 contacts, holds itself energized and also closes a circuit to the motor contactor L whereby the main motor MM is started on its low speed winding. At the same time, the normally closed CR1 contacts of machine #1 in the circuits of Fig. 6 are opened.

(2) Machine #1 is accelerated by its motor MM to a speed limited by the setting of the "Zero Speed Switch" ZS, e. g., to not more than 275 R. P. M. At that speed, contacts ZS1 of switch ZS are closed; contacts ZS2 are opened; relay CR3 is energized through contacts ZS1 and keeps itself energized; relay CR4 is deenergized by the opening of certain CR3 contacts; and other CR3 contacts in the circuit to contactor L open to deenergize contactor L and cause the centrifugal to coast without motor power.

(3) When the speed of the coasting centrifugal drops to a predetermined value, e. g., about 225 R. P. M., contacts ZS2 of the zero speed switch close again to reenergize CR4, whereupon CR3 is deenergized and contactor L is again energized to activate the main motor and keep the centrifugal rotating at a speed suitable for loading.

(4) After a time interval determined by a setting of timer RCT, contacts RCT3 are closed in the circuits to the loading relay LR and to process timer T7. The wash water solenoid valve WWSV is then energized to start a preflushing of the basket screens. When timer T7 times out, WWSV is deenergized, whereupon normally open contacts LR and T7B are closed to keep relay LR energized and to energize the gate solenoid GS. The loading gate for machine #1 then is opened as described hereinabove. The charge feeler 57 moves into working position and limit switch LS is tripped to energize relay LR1 which seals itself in circuit and closes its contacts in the circuit to relay LR2. A charge enters the rotating basket of the machine.

(5) When the desired charge thickness is reached, limit switch LS is returned to its normal position, and relay LR2 is energized. At this point, certain LR2 contacts in the circuit to relay LR are opened to deenergize relay LR and solenoid GS; also, normally open LR2 contacts in the circuit to control timer CT and timer T1 are closed to energize those timers; also, the normally closed LR2 contacts in the circuit to zero speed switch contacts ZS1 and ZS2 are opened to deenergize relays CR3 and CR4. Thus the motor contactor L is freed from the speed limitation imposed by the zero speed switch.

(6) From that point on, the individual machine proceeds through its cycle substantially as disclosed in the above-identified patent and as described in further detail hereinafter.

3. Meanwhile, at an appreciable interval after the closing of contacts BST1, e. g., after two (2) seconds, the battery sequence timer BST opens those contacts to deenergize relays BST1R and BSTR.

4. Battery sequence timer BST now continues to progress through its successive steps of closing contacts BST2 to BST8 and thus energizing relays BST2R to BST8R at definitely timed intervals which are determined by the speed or the settings of this timer. If the eight (8) centrifugal machines each have a normal duty cycle of 144 seconds, and if they are to be kept operating at maximum capacity with a minimum overlapping of their periods of acceleration and high power consumption, they will be started successively at intervals of $$\frac{144}{8} = 18 \text{ seconds}$$

Accordingly, contact BST2 is closed eighteen (18) seconds after the closing of BST1, whereupon:

(a) Relay BST2R is energized;
(b) Normally open BST2R contacts close to energize relay BSTR; and
(c) Other normally open BST2R contacts in the control circuits of machine #2 are closed to energize both the clutch and the motor of the recycling timer RCT of machine #2. This occurs in the same way as described in paragraph 2(c) above with respect to the BST1R contacts of machine #1. Timer RCT of machine #2 proceeds to start that machine in the way described under paragraph 2(c) above.

5. Two (2) seconds after the closing of contact BST2, that contact is opened by BST to deenergize relays BST2R and BSTR.

6. The remaining machines are started at 18-second intervals in the same way as machine #1 and machine #2, but through the successive operations of contacts BST3 to BST8, inclusive.

7. When the last machine of the battery is thus started by the closing of BST8, the time delay relay TDR is energized. This relay measures a suitable interval, say of about 1 second, after the opening of contact BST8, whereupon TDR opens its contacts in the circuit to the battery operating relay BOR so as to deenergize BOR and open the circuits to all the relays of the battery control system. That system thus is inactivated until an occasion arises for it to stop or restart the operations of the several machines.

B. *Stopping and restarting the machines to regain sequence*

1. When the cycles of the independently recycling machines become sufficiently out of step that an excessive drain on the power supply to the battery may be imminent, e. g., when the acceleration periods of the cycles of more than two or the eight machines begin to overlap, the predetermined capacity of the feeder overcurrent device on the power supply lines to the battery will be exceeded. The contact at I in the battery control circuits (Fig. 6) is then closed, whereupon:

(a) Relay BOR is energized and keeps itself energized;
(b) The BOR contacts in the RCT motor circuits of all the eight machines are opened to prevent the continued recycling of the machines; and
(c) Other normally open BOR contacts in the battery control circuits close to energize the clutch of the battery sequence timer BST.

2. All the machines then in the course of a cycle continue to operate until their respective cycles are completed, each machine coming to rest for lack of action by its recycling timer to re-energize its CR1 relay.

3. When all the machines have stopped, all the eight CR1 contacts in Fig. 6 are closed; so energy now flows to relay SR, and it closes contacts to energize the motor of battery sequence timer BST.

4. The battery sequence timer BST now enters into its step by step operations to restart the eight machines in the desired timed sequence, e. g., at 18-second intervals, in the manner described in section A above.

C. *Stopping the machines to discontinue operations*

Whenever it is desired to discontinue the operations of the centrifugal battery, the battery stop button BS may be pressed. This energizes relay BSR which seals itself in circuit, opens the circuits to the battery sequence timer and battery sequence timer relays, and energizes relay BOR. The BOR contacts of the individual machine controls are then opened, so that each centrifugal will complete its pending cycle and remain at rest. Pressing the battery start button BB will cause the battery control to restart the machines in the predetermined sequence described above.

D. *Group sequencing to regulate productivity*

If the rate of production desired from the machines of the battery is less than that obtained by operating them on their normal cycles, the desired reduced rate may be established and maintained while keeping all the machines in service on cycles started in a predetermined sequence, through the action of the battery control system. For this purpose, the selector switch 69 of the illustrated battery control is set at its Group Sequencing position. If the machines are operating at that time, this change will first cause them to complete their individual cycles and come to rest.

Suppose, for example, that the maximum useful cycle time of each machine is about 210 seconds, a longer cycle being likely to render the solids in the basket too dry and hard for proper discharging. Suppose also that the rate of production desired would call for an average cycle time of 280 seconds if all the machines were kept in service. This means that an average idle time of 280 minus 210, or 70 seconds, should be added to the maximum useful cycle time of each machine. It also means that the machines should be started successively at intervals of $$\frac{280}{8}$$

or 35 seconds, in order to have equally spaced starts imposing the minimum drain on the power supply to the battery. Accordingly, the appropriate timers in the individual machine controls are set to give a cycle time of 210 seconds for each machine, and the out time timer OT in the battery control is set to measure an interval of 17 seconds between the time when it is energized and the time when it acts to deenergize itself and restart the motor of the battery sequence timer BST.

1. Those settings having been made, when all the machines come to rest, the eight closed CR1 contacts of Fig. 6 cause relay SR and the motor of battery sequence timer BST to be energized. Timer BST then proceeds to close its BST1 contact and start machine #1 as described in section A. 2. above.

2. At the same time, relay BSTR is energized and its contact BSTR1 closes to energize the clutch coil of the out time timer OT. Normally open OT contact is then closed to seal this clutch coil in circuit.

3. Two seconds later, when BST1 is opened by timer BST, relays BST1R and BSTR are de-energized and contact BSTR2 of BSTR closes to energize the motor of timer OT, contact BSTR1 then reopening, whereupon:

(a) Timer OT starts timing;
(b) Normally closed OT contact in the motor circuit of BST is opened to interrupt the operations of the battery sequence timer.

4. Seventeen (17) seconds after the closing of contact BST1, the out time timer OT times out, resets itself and restores the circuit to the motor of BST; so the battery sequence timer resumes its operation. Thus an interval of 17 seconds is added to the 18 second interval otherwise fixed by the battery sequence time.

5. Thirty-five (35) seconds after the closing of contact BST1, the battery sequence timer closes its BST2 contact and machine #2 is then started as previously described. The out time timer OT again adds 17 seconds to the 18 second interval of BST.

6. Machines #3 through #8 are started in the same manner, at intervals of 35 seconds.

7. Finally, when contact BST8 is closed to start machine #8, a normally open contact BST8R of relay BST8R is closed to energize time delay relay TDR1. This relay then seals itself in circuit and closes its contact TDR1 (AUX) in the circuit to the battery sequence timer BST, at the same time opening its normally closed contact in that circuit. When TDR1 is energized, TRD also is energized to keep BST energized through contact TDR (AUX). Two (2) seconds after the closing of contact BST8, that contact is opened and the out time timer OT is started. Time delay relay TDR is deenergized at the same time, thus opening its contact TDR (AUX) and deenergizing the battery sequence timer BST, which resets itself. One (1) second later TDR closes its normally closed TDR contact, but the battery sequence timer is not restarted because the out time timer meanwhile is operating.

After the preset 17 seconds of its operation, timer OT opens contacts which deenergize OT and relay TDR1 at the same time. At this point, the two TDR1 contacts in the circuit to the battery sequence timer are opened. TDR1 now operates for an interval of 16 seconds, at the end of which it closes its normally closed TDR1 contact in the circuit to BST and thus restarts the battery sequence timer.

It results that an interval of 2+17+16 seconds is interposed between the time of the closing of contact BST8 to start machine # 8 and the time of the reclosing of contact BST1 by the reset battery sequence timer BST. So machine #1 is started on a new cycle 35 seconds after the starting of machine #8 and 280 seconds after the previous starting of machine #1.

DETAILED OPERATIONS OF AN INDIVIDUAL MACHINE

A detailed description of the operations of an individual centrifugal machine through the loading period of its cycle is set forth in paragraphs (1) to (6) under section A. 2. above. From the point of the deenergization of relays CR3 and CR4 to begin the acceleration of the loaded basket, the operations occurring according to the diagram of Fig. 5 are as follows:

1. Contactor L being energized, the loaded basket is accelerated by the operation of motor MM on its low speed winding. Timers CT and T1 meanwhile are operating.

2. After a preset interval, control timer contact CT1 is closed to energize relay CR2, whereupon contactor L is deenergized, contactor H is energized to connect motor MM on its high speed winding, and the motor of timer CT is deenergized. The basket now proceeds to accelerate to its full speed.

3. Meanwhile, timer T1 times out to close its contact T1B and energize timer T2 which closes contact T2C in the circuit to the wash water solenoid valve WWSV and starts a first washing of the basket charge.

4. After a preset interval, timer T2 times out to open contact T2C and stop the first washing operation. At the same time it starts timers T3 and T5 by closing contact T2B.

5. After a preset interval, timer T3 times out to close contact T3B, energize timer T4 and open contact T3C, whereupon contact T4C is closed to energize WWSV and start a second washing operation.

6. After a preset interval, timer T4 times out to terminate the second washing operation by opening contact T4C, and to energize timer T6.

7. Meanwhile, timer T5 has timed out to close contact T5B and energize the syrup separator solenoid valves SSSV1 and SSSV2, whereupon a syrup separator (not shown) is shifted to separate wash syrup from the mother liquor previously purged from the basket charge.

8. After a preset spinning time has elapsed, timer T6 times out to open its contact T6B in the circuit to relay CR2, whereupon that relay is deenergized, motor contactor H is deenergized, the motor of control timer CT is restarted, and contactor L is energized to connect the motor MM on its low speed winding for a period of regenerative braking.

9. After a preset interval, timer CT closes its contact CT2 to energize the brake relay BR and the brake solenoid valve BSV. Relay BR seals itself in circuit and opens contacts in the circuit to the motor contactors L and H. Thus, the motor MM is disconnected from its power lines and the brake 23 is applied to stop the machine.

10. When the machine has decelerated to a speed of about 300 R. P. M., timer CT closes its contact CT3 to energize relay CR3 and bring the zero speed switch contacts into the circuits.

11. When the basket speed falls to about 225 R. P. M., contact ZS2 closes to energize relay CR4. Normally open CR4 contacts then close to hold CR4 energized, to start the discharge timer DT, and to energize the valve lifter solenoid valves VLSV1 and VLSV2. The basket valve 26 thus is lifted away from the discharge outlet 17a as the basket comes to a stop.

12. Discharge timer contact DT2 is now closed to energize contactor DMS and the discharge clutch solenoid valve DCSV. A normally closed DMS contact is opened at the same time to deenergize the brake solenoid valve BSV. Thus, the mechanical brake is released and the discharge drive DD operates to bring the basket to a speed of about 30 R. P. M. in reverse direction.

13. After a preset interval, discharge timer contact DT3 closes to energize solenoid valve DSV1 which causes the discharger shoe 33 to be moved outwardly into the basket charge. After a further interval, contact DT4 is closed and solenoid valves DSV2 and DSV3 are energized to cause the downward movement of shoe 33 in the basket. After further intervals, contact DT3 is opened, deenergizing DSV1 so that the shoe is withdrawn from the basket wall by spring 38, and contact DT4 is opened to deenergize valves DSV2 and DSV3 so that the discharger shoe moves upward to its normal rest position.

14. After a preset interval, discharge timer contact DT2 is opened to deenergize contactor DMS and discharge solenoid valve DCSV, whereupon the discharge drive DD becomes inactive, the brake 23 is applied and the basket comes to rest.

15. Finally, at a preset time, discharge timer contact DT5 is closed in the circuits to the recycle timer RCT. If the battery control permits, the recycle timer then starts operating. Its first action is to close contact RCT1 and energize relay AC1, whereupon normally closed contact AC1 is opened in the circuit to all the timers except RCT; so all those timers and the related relays reset themselves. Timer RCT next opens its RCT1 contact, and the controls of the individual machine are now ready to enter into a new cycle of operations through the closing of contact RCT2 as described under section A. 2. above.

While the group sequencing operations to obtain reduced productivity are carried out in the illustrated embodiment by holding each machine at rest for a definite time after it has been discharged and then starting its rotation in a new cycle to bring it to loading speed, a similar mode of operation can be obtained in other ways. For example, if the material processed in the machines is of a kind that will not become too dry and hard for proper discharging when subjected to a long "drying" period, the sequential recycling of the individual machines by the battery control may occur by starting their respective periods of deceleration from full speed. In this event, the drying period of their cycles is lengthened or shortened by the action of the "out time" timer to obtain the desired rate of production from the battery. Another way of achieving a similar mode of operation is to effect the sequential recycling of the individual machines by the battery control at the start of the final working operations of their respective cycles, so that any time to be added to their cycles will be added to their "purging" periods. This may increase the extent of purification of the basket charge without adding objectionally to its dryness and hardness at the time of the discharging operation.

It is to be understood that the foregoing detailed descriptions and the accompanying drawings are illustrative and that the combinations and improvements herein disclosed may be embodied in various other ways without departing from the invention defined by the claims.

What is claimed is:

1. In a heavy centrifugal installation including a plurality of cyclical centrifugal machines each having its own control system for automatically programming the machine through a predetermined cycle of operations independently of the cycles of the other machines and each having recycling means connected with said system for causing the machine to enter into and automatically to repeat said cycle, a battery control comprising a plurality of actuators respectively operable to activate said recycling means of said machines individually, timing means having a plurality of correlated timing elements respectively connected individually with said actuators and operative successively at predetermined intervals to operate said actuators in a predetermined timed sequence, and means for starting said timing means, whereby the machines are started on their respective cycles in a predetermined timed sequence.

2. In a heavy centrifugal installation including a plurality of cyclical centrifugal machines each having its own control system for automatically programming the machine through a predetermined cycle of operations independently of the cycles of the other machines and each having recycling means connected with said system for causing the machine to enter into and automatically to repeat said cycle, a battery control comprising a plurality of actuators respectively operable to activate said recycling means of said machines individually, timing means having a plurality of correlated timing elements respectively connected individually with said actuators and operative successively at predetermined intervals to operate said actuators in a predetermined timed sequence, means for starting said timing means, whereby the machines are started on their respective cycles in a predetermined timed sequence, and means rendered operative upon the starting of the last-to-be-started of said machines for inactivating said battery control, so that the machines will repeat their respective cycles independently of each other and of said battery control.

3. In a heavy centrifugal installation including a plurality of cyclical centrifugal machines each having its own control system for programming the machine through a predetermined cycle of operations independently of the cycles of the other machines and each having recycling means connected with said system for causing the machine to enter into and automatically to repeat said cycle, a battery control comprising means rendered operative upon the occurrence of an inordinate flow of power to said machines for inactivating the recycling means of all said machines, so that the machines in operation will complete but not repeat their cycles, a plurality of actuators respectively operable to activate said recycling means individually, timing means having a plurality of correlated timing elements respectively connected individually with said actuators and operative successively at predetermined intervals to operate said actuators in a predetermined timed sequence, and means rendered operative when all the machines in operation have completed their cycles for restarting said timing means, whereby the machines are restarted on their respective cycles in a predetermined timed sequence.

4. In a heavy centrifugal installation including a plurality of cyclical centrifugal machines each having its own control system for automatically programming the machine through a predetermined cycle of operations independently of the cycles of the other machines and each having recycling means connected with said system for causing the machine to enter into and automatically to repeat said cycle, a battery control comprising a plurality of actuators respectively operable to activate said recycling means individually, timing means having a plurality of correlated timing elements respectively connected individually with said actuators and operative successively at predetermnied intervals to operate said actuators in a predetermined timed sequence, manually operable means for starting said timing means, whereby the machines are started on their respective cycles in a predetermined timed sequence, means rendered operative upon the starting of the last-to-be-started of said machines for inactivating said battery control, so that the machines will repeat their respective cycles independently of each other and of said battery control, means rendered operative upon the occurrence of an inordinate flow of power to said machines for inactivating the recycinig means of all said machines, so that the machines in operation will complete but not repeat their cycles, and means rendered operative when all the machines in operation have completed their cycles for restarting said timing means, whereby the machines are restarted on their respective cycles in a predetermined timed sequence.

5. In a heavy centrifugal installation including a plurality of cyclical centrifugal machines each having its own control system for automatically programming the machine through a predetermined cycle of operations independently of the cycles of the other machines and each having recycling means connected with said system for causing the machine to enter into and automatically to repeat said cycle, a battery control comprising a plurality of actuators respectively operable to activate said recycling means individually, timing means having a plurality of correlated timing elements respectively connected individually with said actuators and operative successively at predetermined intervals to operate said actuators in a predetermined timed sequence, means for starting said timing means, an adjustable delay timer, means responsive to the operation of each of said timing elements for starting said delay timer and interrupting the operation of said timing means, and means operated by said delay timer after a predetermined interval of its operation for restarting said timing means, whereby the machines are started on their respective cycles in sequence at intervals determined by the intervals of operation of said timing elements and the adjustment of said delay timer.

6. In a heavy centrifugal installation including a plurality of cyclical centrifugal machines each having its own control system for automatically programming the machine through a predetermined cycle of operations independently of the cycles of the other machines and each having recycling means connected with said system for causing the machine to enter into and automatically to repeat said cycle, a battery control comprising a plurality of actuators respectively operable to activate said recycling means individually, timing means having a plurality of correlated timing elements respectively connected individually with said actuators and operative successively at predetermined intervals to operate said actuators in a predetermined timed sequence, means for starting said timing means, an adjustable delay timer, means responsive to the operation of each of said timing elements for starting said delay timer and interrupting the operation of said timing means, means operated by said delay timer after a predetermnied interval of its operation for restarting said timing means, whereby the machines are started on their respective cycles in sequence at intervals determined by the intervals of operation of said timing elements and the adjustment of said delay timer, and time delay means rendered operative by the last-to-be-operated of said timing elements for resetting said timing means, so that the machines will continue to be recycled at said determined intervals by the action of said battery control.

References Cited in the file of this patent

UNITED STATES PATENTS

| | | |
|---|---|---|
| 1,726,674 | Lockett | Sept. 3, 1929 |
| 2,130,864 | Steps | Sept. 20, 1938 |
| 2,264,247 | Neuman | Nov. 25, 1941 |
| 2,667,974 | Hertrich | Feb. 2, 1954 |